United States Patent
Estabrooks et al.

(10) Patent No.: US 6,177,948 B1
(45) Date of Patent: Jan. 23, 2001

(54) PQE FOR FONT VS. LARGE DARK PATCH

(75) Inventors: Dennis C. Estabrooks, Longmont; Jack L. Zable, Niwot, both of CO (US)

(73) Assignee: International Business Machines Corporation, Armonk, NY (US)

( * ) Notice: Under 35 U.S.C. 154(b), the term of this patent shall be extended for 0 days.

(21) Appl. No.: 09/046,164

(22) Filed: Mar. 23, 1998

(51) Int. Cl.[7] .......................... B41J 2/385; G03G 15/043
(52) U.S. Cl. .............................................. 347/129; 399/51
(58) Field of Search ............................ 358/1.9; 399/181, 399/182, 51; 347/129, 131

(56) References Cited

U.S. PATENT DOCUMENTS

| | | |
|---|---|---|
| 4,403,257 | 9/1983 | Hsieh . |
| 4,460,909 | 7/1984 | Bassett et al. . |
| 4,882,252 | 11/1989 | Kawamura et al. . |
| 4,967,211 | 10/1990 | Colby et al. . |
| 5,357,583 | 10/1994 | Sato et al. . |

OTHER PUBLICATIONS

D. Estabrooks, M. J. Stanich, "Print Quality Enhancement in Electrophotographic Printers".
High–End Printing—Boulder; MJS–SCPTECH5–1; Aug. 6, 1997.
Jul. 1970 p. 332–333 IBM TDB, H.T. Hilton, "Scan Laser Character Generator".

*Primary Examiner*—Fred L. Braun
(74) *Attorney, Agent, or Firm*—William N. Hogg (57) ABSTRACT

An electrophotographic apparatus and method are provided to reduce smearing on printed medium by reducing the toner pile height of printed lines and characters. Control is provided for establishing the amount of toner to be applied on a picture element (PEL) basis. This is accomplished by the creation of mask patterns that distinguish characters and lines from large patches to be printed, and by identifying PELs internal of characters boundary requiring exposure modulation during printing.

19 Claims, 6 Drawing Sheets

SYMMETRICAL MASK PATTERNS

```
          COLUMN
    1  2  3  4  5  6  7  8  9
A   □  □  □  □  □  □  □  □  □
B   X  X  X  X  X  X  X  X  X
C   X  X  X  X  X  X  X  X  X
D   X  X  X  P  P  P  X  X  X
E   X  X  X  P [P] P  X  X  X
F   X  X  X  P  P  P  X  X  X
G   X  X  X  X  X  X  X  X  X
H   X  X  X  X  X  X  X  X  X
I   □  □  □  □  □  □  □  □  □
```

P=PRINT
□ =NO PRINT
X=PRINT OR NO PRINT

Fig.6A

SYMMETRICAL MASK PATTERNS

```
          COLUMN
    1  2  3  4  5  6  7  8  9
A   □  X  X  X  X  X  X  X  □
B   □  X  X  X  X  X  X  X  □
C   □  X  X  X  X  X  X  X  □
D   □  X  X  P  P  P  X  X  □
E   □  X  X  P [P] P  X  X  □
F   □  X  X  P  P  P  X  X  □
G   □  X  X  X  X  X  X  X  □
H   □  X  X  X  X  X  X  X  □
I   □  X  X  X  X  X  X  X  □
```

P=PRINT
□ =NO PRINT
X=PRINT OR NO PRINT

Fig.6B

PREDETERMINED STROKE PATTERN

```
                    COLUMN
    1   2    3    4    5  6  7  8  9  10 11 12 13 14
A   0   0    0    0    0  0  0  0  0  0  0  0  0  0
B   0   1   1(a)  1    1  1  1  1  1  1  1  1  1  0
C   0  1(b)  1   1(c)  1  1  1  1  1  1  1  1  1  0
D   0   1    1    1    1  1  1  1  1  1  1  1  1  0
E   0   0    0    0    0  0  0  0  0  0  0  0  0  0
```

1=PRINT
0=NO PRINT

ALL UNSHOWN PELS ARE "0"

MASK:
- P
- □
- X

PRINTED PATTERN:
- 1
- 0

|   | 1 | 2 | 3 | 4 | 5 | 6 | 7 | 8 | 9 |
|---|---|---|---|---|---|---|---|---|---|
| A | □0 | □0 | □0 | □0 | □0 | □0 | □0 | □0 | □0 |
| B | X0 | X0 | X0 | X0 | X0 | X0 | X0 | X0 | X0 |
| C | X0 | X0 | X0 | X0 | X0 | X0 | X0 | X0 | X0 |
| D | X0 | X0 | X0 | P0 | P0 | P0 | X0 | X0 | X0 |
| E | X0 | X0 | X0 | P1 | P1 | P1 | X1 | X1 | X1 |
| F | X0 | X0 | X0 | P1 | P1 | P1 | X1 | X1 | X1 |
| G | X0 | X0 | X0 | X1 | X1 | X1 | X1 | X1 | X1 |
| H | X0 | X0 | X0 | X0 | X0 | X0 | X0 | X0 | X0 |
| I | □0 | □0 | □0 | □0 | □0 | □0 | □0 | □0 | □0 |

Fig.9

MASK:
- P = PRINT
- □ = NO PRINT
- X = PRINT OR NO PRINT

PRINTED PATTERN:
- 1 = PRINT
- 0 = NO PRINT

|   | 1 | 2 | 3 | 4 | 5 | 6 | 7 |
|---|---|---|---|---|---|---|---|
| A | □0 | □0 | □0 | □0 | □0 | □0 | □0 |
| B | □0 | □0 | X0 | X0 | X0 | □0 | □0 |
| C | □0 | X0 | X0 | X0 | X0 | X0 | □0 |
| D | X0 | X1 | P1 | P1 | P1 | X1 | X1 |
| E | X0 | X1 | P1 | P1 | P1 | X1 | X1 |
| F | X0 | X1 | P1 | P1 | P1 | X1 | X1 |
| G | □0 | X0 | X0 | X0 | X0 | X0 | □0 |
| H | □0 | □0 | X0 | X0 | X0 | □0 | □0 |
| I | □0 | □0 | □0 | □0 | □0 | □0 | □0 |

Fig.10

PREDETERMINED DOT PATTERN

1 = PRINT
0 = NO PRINT

|   | 1 | 2 | 3 | 4 | 5 | 6 | 7 |
|---|---|---|---|---|---|---|---|
| A | 0 | 0 | 0 | 0 | 0 | 0 | 0 |
| B | 0 | 0 | 1 | 1 | 1 | 0 | 0 |
| C | 0 | 1 | 1 | 1 | 1 | 1 | 0 |
| D | 0 | 1 | 1 | 1(d) | 1 | 1 | 0 |
| E | 0 | 1 | 1 | 1 | 1 | 1 | 0 |
| F | 0 | 0 | 1 | 1 | 1 | 0 | 0 |
| G | 0 | 0 | 0 | 0 | 0 | 0 | 0 |

Fig.11

MASK
P
□
X

PRINTED PATTERN
1
0

| | COLUMN | | | | | | |
|---|---|---|---|---|---|---|---|
| | 1 | 2 | 3 | 4 | 5 | 6 | 7 |
| A | □ 0 | □ 0 | □ 0 | □ 0 | □ 0 | □ 0 | □ 0 |
| B | X 0 | X 0 | X 0 | X 0 | X 0 | X 0 | X 0 |
| C | X 0 | X 0 | X 1 | X 1 | X 1 | X 0 | X 0 |
| D | X 0 | X 1 | P 1 | P 1 | P 1 | X 1 | X 0 |
| E | X 0 | X 1 | P 1 | [P 1] | P 1 | X 1 | X 0 |
| F | X 0 | X 1 | P 1 | P 1 | P 1 | X 1 | X 0 |
| G | X 0 | X 0 | X 1 | X 1 | X 1 | X 0 | X 0 |
| H | X 0 | X 0 | X 0 | X 0 | X 0 | X 0 | X 0 |
| I | □ 0 | □ 0 | □ 0 | □ 0 | □ 0 | □ 0 | □ 0 |

Fig.12A

ASSYMMETRICAL MASK PATTERNS

| | COLUMN | | | | | | | | |
|---|---|---|---|---|---|---|---|---|---|
| | 1 | 2 | 3 | 4 | 5 | 6 | 7 | 8 | 9 |
| A | □ | □ | □ | □ | □ | □ | □ | □ | □ |
| B | X | X | X | X | X | X | X | X | X |
| C | X | X | X | X | X | X | X | X | X |
| D | X | X | P | P | P | P | P | P | X |
| E | X | X | P | [P] | P | P | P | P | X |
| F | X | P | P | P | P | P | P | X | X |
| G | X | X | X | X | X | X | X | X | X |
| H | X | X | X | X | X | X | X | X | X |
| I | □ | □ | □ | □ | □ | □ | □ | □ | □ |

P=PRINT
□ =NO PRINT
X=PRINT OR NO PRINT

Fig.12B

ASSYMMETRICAL MASK PATTERNS

| | COLUMN | | | | | | | | |
|---|---|---|---|---|---|---|---|---|---|
| | 1 | 2 | 3 | 4 | 5 | 6 | 7 | 8 | 9 |
| A | □ | X | X | X | X | X | X | X | □ |
| B | □ | X | X | P | P | X | X | X | □ |
| C | □ | X | P | P | P | X | X | □ | |
| D | □ | X | P | P | P | X | X | □ | |
| E | □ | X | P | P | P | X | X | □ | |
| F | □ | X | X | P | [P] | P | X | X | □ |
| G | □ | X | X | P | P | P | X | X | □ |
| H | □ | X | X | X | X | P | X | X | □ |
| I | □ | X | X | X | X | X | X | X | □ |

P=PRINT
□ =NO PRINT
X=PRINT OR NO PRINT

Fig.13

Mask:
- P
- □ } MASK
- X

- 1 } PRINTED
- 0 } PATTERN

|   | 1 | 2 | 3 | 4 | 5 | 6 | 7 | 8 | 9 |
|---|---|---|---|---|---|---|---|---|---|
| A | □ 0 | □ 0 | □ 0 | □ 0 | □ 0 | □ 0 | □ 0 | □ 0 | □ 0 |
| B | X 0 | X 0 | X 0 | X 0 | X 0 | X 0 | X 0 | X 0 | X 0 |
| C | X 0 | X 0 | X 0 | X 1 | X 1 | X 1 | X 0 | X 0 | X 0 |
| D | X 0 | X 0 | X 1 | P 1 | P 1 | P 1 | P 1 | P 0 | P 0 |
| E | X 0 | X 0 | X 1 | P 1 | [P 1] | P 1 | P 1 | P 0 | P 0 |
| F | X 0 | X 0 | P 1 | P 1 | P 1 | P 1 | P 1 | P 0 | X 0 |
| G | X 0 | X 0 | X 0 | X 1 | X 1 | X 1 | X 0 | X 0 | X 0 |
| H | X 0 | X 0 | X 0 | X 0 | X 0 | X 0 | X 0 | X 0 | X 0 |
| I | □ 0 | □ 0 | □ 0 | □ 0 | □ 0 | □ 0 | □ 0 | □ 0 | □ 0 |

Fig.14

|   | 1 | 2 | 3 | 4 | 5 | 6 | 7 | 8 | 9 |
|---|---|---|---|---|---|---|---|---|---|
| A | □ 0 | □ 0 | □ 0 | □ 0 | □ 0 | □ 0 | □ 0 | □ 0 | □ 0 |
| B | X 0 | X 0 | X 0 | X 0 | X 0 | X 0 | X 0 | X 0 | X 0 |
| C | X 0 | X 0 | X 0 | X 0 | X 0 | X 0 | X 0 | X 0 | X 0 |
| D | X 0 | X 0 | X 0 | P 0 | P 1 | P 1 | P 1 | P 1 | P 1 |
| E | X 0 | X 0 | X 0 | P 0 | [P 1] | P 1 | P 1 | P 1 | P 1 |
| F | X 0 | X 0 | P 0 | P 0 | P 1 | P 1 | P 1 | P 1 | X 1 |
| G | X 0 | X 0 | X 0 | X 0 | X 0 | X 0 | X 0 | X 0 | X 0 |
| H | X 0 | X 0 | X 0 | X 0 | X 0 | X 0 | X 0 | X 0 | X 0 |
| I | □ 0 | □ 0 | □ 0 | □ 0 | □ 0 | □ 0 | □ 0 | □ 0 | □ 0 |

Fig.15

|   | 1 | 2 | 3 | 4 | 5 | 6 | 7 | 8 | 9 |
|---|---|---|---|---|---|---|---|---|---|
| A | □ 0 | □ 0 | □ 0 | □ 0 | □ 0 | □ 0 | □ 0 | □ 0 | □ 0 |
| B | □ 0 | X 0 | X 0 | P 0 | P 0 | □ 0 | X 0 | X 0 | □ 0 |
| C | □ 0 | X 0 | X 0 | P 0 | P 0 | P 0 | X 0 | X 0 | □ 0 |
| D | □ 0 | X 0 | X 0 | P 0 | P 0 | P 0 | X 0 | X 0 | □ 0 |
| E | □ 0 | X 0 | X 0 | P 0 | P 0 | P 0 | X 0 | X 0 | □ 0 |
| F | □ 0 | X 0 | X 0 | P 1 | [P 1] | P 1 | X 1 | X 1 | □ 1 |
| G | □ 0 | X 0 | X 0 | P 1 | P 1 | P 1 | X 0 | X 0 | □ 1 |
| H | □ 0 | X 0 | X 0 | X 1 | X 1 | P 1 | X 1 | X 1 | □ 1 |
| I | □ 0 | □ 0 | □ 0 | □ 0 | □ 0 | □ 0 | □ 0 | □ 0 | □ 0 |

PQE FOR FONT VS. LARGE DARK PATCH

BACKGROUND

1. Field of the Invention

This invention relates generally to electrophotographic printers and related processes. More particularly, the invention provides for an apparatus and method that controls the toner pile height of each picture element (PEL) of a printed character independently to reduce smearing on the printing medium.

2. Description of Related Art

In electrophotographic printers, photoreceptor material is electrostatically charged, is exposed by a light source to form an image, the image is developed using toner, and finally, the image on the photoreceptor is transferred onto a print medium such as paper. The stored data to be printed is image pattern data that is held in digitized form in memory within the printer. After the photoreceptor has been electrostatically charged, a voltage source, such as that which controls the light source, discharges areas of the photoreceptor to alter the electrostatic fields in a pattern that mirrors the image pattern data stored in memory. When the powder or toner carries a charge of the same polarity as the charge pattern on the photoreceptor, the toner is electrostatically attracted to areas of the photoreceptor which are discharged to produce an image, such as characters, lines or large patches of print that produce large images. As a result, the heavily discharged areas receive large, usually black, toner deposits and produce dark areas, and the lighter discharged areas will receive lesser amounts of toner deposits to produce gray images. The above describes the commonly employed, discharged-area-development (DAD) process, by which the highly charged areas of the photoreceptor represent white background and the discharge areas represent areas in which toner is to be deposited. The charged area development process (CAD) may also be used. In the CAD process, the toner carries a charge opposite in polarity to the charge pattern on the photoreceptor and the toner is deposited on the charged areas of the photoreceptor. In the CAD process, the light source discharges the white background areas. Since a typical printed page has about ten times more white space than print, the CAD process is less commonly employed.

Print Quality Enhancement (PQE) is a well known form of image enhancement that is used to improve print quality. Image pattern data is organized such that each bit in memory represents a specific picture element (PEL) of the image to be printed on the printed material. PQE relies on an imaging system wherein the electrostatic field of each PEL to be imaged on the photoreceptor may be altered independently. Prior to PQE technology, electrophotographic printers could only turn "on" or turn "off" a voltage controlling the light source for each PEL, and there was no modulation, and therefore, no independent control of toner deposition from PEL to PEL within each PEL. With PQE, each dot or PEL represents either white background or an area to be printed black. A PQE algorithm generates an exposure value for each PEL based on neighboring PELs. The print quality improvement results by precisely exposing each PEL according to PEL data surrounding it.

Electrostatic field gradients control the amount of toner deposited, and these gradients are largest at the edges of print, such as the entire width of thin character or line strokes, or the edge PELs of large printed patches, for example, photographs. This phenomenon is commonly referred to as "edge effect." It is a well known problem that significantly more toner, that is, a greater pile height of toner, is deposited at the periphery or edge of print, either at the edge PELs of a large printed patch, or across an entire character or line made up of thin strokes.

When image receiving material such as paper is rolled out of a printer on a continuous roll, then it can be either cut and stacked or folded and stacked. Because of the relative motion and pressure that occurs in the stacking operation, the high toner pile height of characters fractures and smears the paper.

U.S. Pat. No. 4,967,211 calls for balancing toner deposits made on printed images. If the image pattern data is recognized as solid area data, the exposure at the edge PELs is modulated to prevent excess toner deposition. Also, if the image pattern data is recognized as character or line data, the exposure of the entire character stroke or line stroke is modulated to prevent excessive toner deposition. The problem with reducing toner deposition on lines and characters, however, is the reduction in visible size of the printed character or line because PELs of the entire width are modulated. Another problem is the reduction in optical density. Optical density is typically reduced to below a value of 1.0. Optical density is extremely important for obtaining high character legibility and print quality. Changes in optical density that are greater than about 1.2 are not visually noticeable to the eye.

A printing apparatus and a method of printing are needed to reduce smearing of printed characters without noticeably reducing the size of the character or the optical density of the character, and while leaving large print patches unaffected.

SUMMARY OF THE INVENTION

This invention provides an electrophotographic printing apparatus and a method of printing that reduces smear of printed characters and lines on printed material while yielding an optical density that is greater than 1.2. The electrophotographic printer herein reduces toner pile height of interior areas of printed characters according to logic that compares at least one mask matrix with predetermined image pattern data to be printed.

A program is provided in the printer to perform logical operations that distinguish character and line strokes from patch print, for example photographs, made up of gray level image data. The program determines whether the target PEL to be printed belongs to a character or line, and more specifically, whether the target PEL data corresponds to an area interior of a character or line, that is, a non-edge PEL. The program comprises at least one mask matrix, and performs logical operations on a PEL-by-PEL basis that compares the mask matrix to the predetermined image pattern data, stored in memory, on a PEL-by-PEL basis. The electrophotographic printer apparatus also comprises a controller that may modulate the voltage of the photoreceptor to affect the amount of toner to be applied for each PEL of data. The toner pile height is reduced if the program makes a determination that the target PEL data corresponds to an area interior of a character.

In the preferred embodiment of the present invention, the printer apparatus controls the voltage of the light source to vary the electrostatic fields and thus the exposure of the photoconductor. The program compares the stored image pattern data to the mask matrix, and if there is a total match for every PEL of the mask matrix, the controller modulates the voltage of the light source, such as a laser light source or a light emitting diode array (LED) source, for example. When the drum covered by the photoreceptor rotates from the imaging station to the developing station, less toner is applied than would otherwise be applied and the toner pile height of the printed character is thereby reduced.

In another embodiment of the invention, the photoreceptor exposure, and therefore toner deposition may be controlled by initially controlling the drum charging voltage in conjunction with modulation of the light source voltage.

In yet another embodiment of the invention, the pile height of toner may also be controlled by varying the bias voltage at the developing station in conjunction with modulation of the light source.

BRIEF DESCRIPTION OF DRAWINGS

The above-mentioned features of this invention, and the manner of attaining them will become more apparent by reference to the following drawings and the descriptions which follow.

DETAILED DESCRIPTION OF THE INVENTION

The invention herein provides an electrophotographic printing apparatus and a method of printing that reduces smear of printed characters and lines on printed material while yielding an optical density that is greater than 1.2. The invention herein comprises a program that recognizes character and line print and that also identifies whether the target PEL is interior of a character. The identification of PELs interior of a character, signals modulation of a voltage source, such as that to a laser beam, for example. Program logic stores at least one mask pattern and compares the mask pattern to the predetermined image pattern data. Where total match is found on a PEL-by-PEL basis, the program signals the controller to modulate a voltage source, such as light intensity or duration or both. The voltage is modulated according to a value determined empirically to provide optimum print development with reduced toner pile height for the image pattern PEL to be printed.

Image Control

Figure 1:
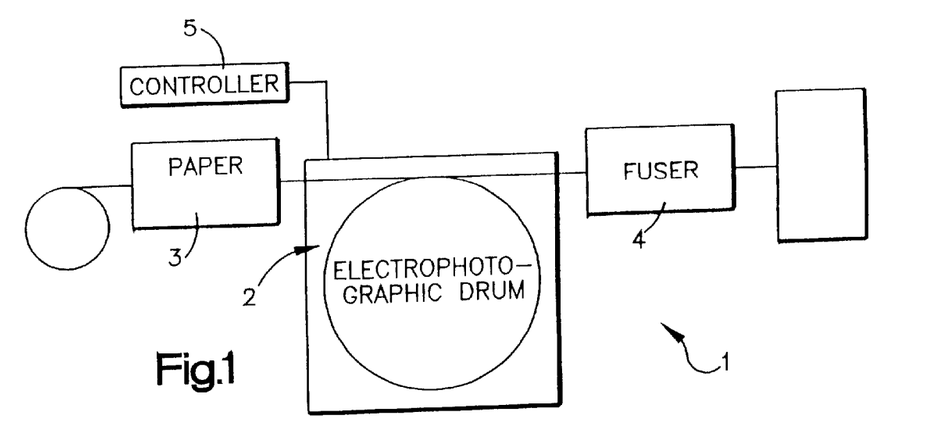
FIG. 1 is a schematic representative of an electrophotographic printer.
Figure 2:
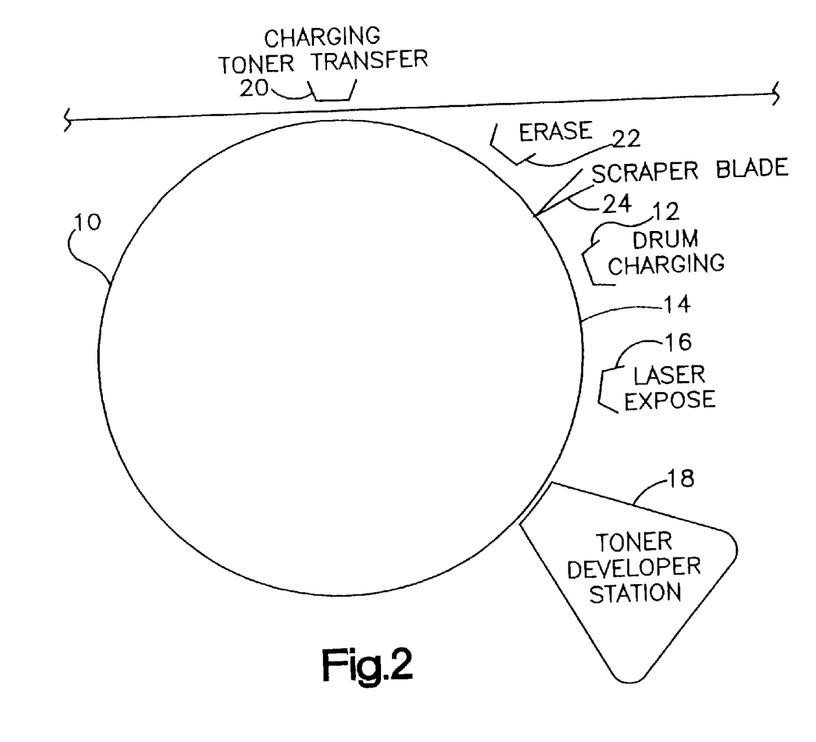
FIG. 2 is a schematic of the printing station representative of FIG. 1.

The schematic representative of FIG. 1 is an electrophotographic printer 1 that produces print by creating an image of the print on a photoreceptor material 2, developing the image, and then transferring the image to the print medium 3 followed by fusing at fusing station 4. A more detailed schematic of printer 1 of FIG. 1 is shown in FIG. 2. Photoreceptor 14 is placed around rotating drum 10 and rotates past drum charging station 12 so that the surface of photoreceptor 14 is exposed to voltage to produce an electrostatic charge on the entire surface of photoreceptor 14. As drum 10 rotates, photoreceptor 14 passes by imaging station 16, which includes a light source, where it receives light rays. The light rays change the electrostatic charge pattern on the photoreceptor according to the predetermined image pattern data of each PEL stored in memory in the printer.

Next, drum 10 covered by photoreceptor 14 passes through developing station 18 and the electrostatic image is developed with fine black powder or toner by a developer. In a DAD process, for example, the powder or toner carries a charge that is the same polarity of the photoreceptor and is electrostatically attracted to the discharged PELs that make up the image. Photoreceptor 14 has a developed image, and the drum 10 continues to rotate from developing station 18 to transfer station 20 where print medium 3 of FIG. 1, for example paper, is placed in contact with the developed image. The developed image is transferred onto the print medium by applying a charge on the paper that will attract the toner. This is done at station 20. After the developed image is transferred, photoreceptor 14 is "erased" at 22 to remove or loosen nontransferred toner and drum 10 passes through scraper blade 24 that cleans the surface of photoreceptor 14.

Figure 3:
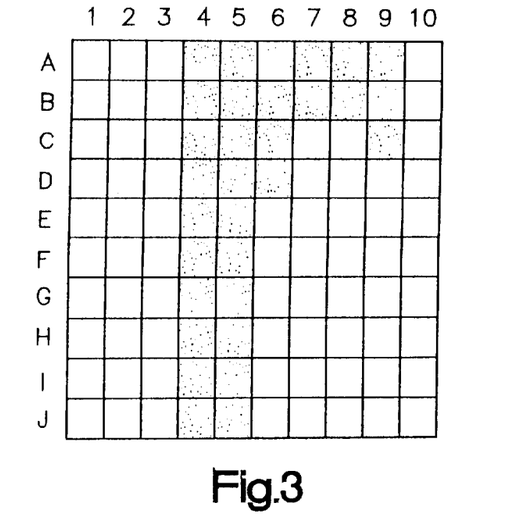
FIG. 3 illustrates an example of possible dimensions of the character print "r" in a character stroke pattern of PELs.

FIG. 3 shows one example of the character letter "r" as a printed stroke pattern data as it would be portrayed on a matrix of picture elements, PELs. Each PEL of the matrix corresponds to digitized image pattern data representing either a dot (print) or blank (no print), collectively representing the photoreceptor image to be displayed. The letter "r" shown as an example in FIG. 3 has a two-dimensional PEL pattern. At various cross-sections of the character, the letter "r" ranges in size from 2, 3, 4, 6 or 10 PELs in any one direction.

The number of PELs that are imaged on a given photoreceptor depends upon the type of printer. For example, in an Infoprint 4000 printer made by IBM, 300×300 or 90,000 PELs may be imaged on each square inch of the photoreceptor. The image pattern data that is stored in memory is read in horizontal rows and vertical columns, one PEL at a time. The PEL being read at a given time is herein defined as the "target PEL". Image pattern data may signal a "1" (print) or "0" (no print) at each PEL. A "1" signal causes toner to be attracted to the photoreceptor at the target PEL.

The electrophotographic printer apparatus of the invention herein, comprises a program that performs logical operations to compare at least one stored mask matrix with the predetermined image pattern data on a PEL-by-PEL basis. The target PEL is read by comparing the image pattern data surrounding the target PEL (including the target PEL) with the mask matrix. If the mask pattern exactly matches the image pattern data, the program determines that the target PEL is positioned interior of a character.

The printer apparatus also comprises a controller 5 that modulates a voltage of the light source. The voltage power of the light source alters the electrostatic fields on the photoreceptor to control the amount of toner deposited on the photoreceptor. If the program logic determines that the target PEL is positioned interior of a line or character, less toner will be deposited.

In one embodiment of the invention, the controller modulates the voltage of the light source, for example, a laser light source or a light emitting diode array (LED), on a PEL-by-PEL basis. In a DAD process, for example, the light source discharges the area to be printed according to a predetermined value for the image pattern data. Each PEL is read and compared to at least one mask matrix. If there is a total match between the mask matrix and the image pattern data at the target PEL, the controller will affect the light source voltage such that the photoreceptor at the target PEL will be discharged less than originally programmed.

In another embodiment of the invention, the controller modulates the light voltage and the light is in circuit communication with the drum charging station. The term "in circuit communication" as used herein is used to describe (i) devices that are directly or indirectly electrically connected with each other, (ii) devices having other devices or combinations of devices (e.g., analog-to-digital converters, digital-to-analog converters, sensors, resistors, transistors, breakers, amplifiers, relays, buffers, drivers, transmitters, receivers, and decoders) between them, (iii) devices in optical communication with each other (via, e.g., an optoisolator or fiber optic link), (iv) devices in electromagnetic communication with each other (via, e.g., radio frequency transmitter and receiver pair), (v) devices connected by and through other structures allowing them to communicate with each other, and (vi) any combination of any of the above. The amount of toner deposited on the photoreceptor is determined by the initial charge on the drum. Hence, the drum charging voltage in conjunction with the light source voltage affects the overall toner pile height.

In another embodiment, the controller affects the light source voltage and the controller is in circuit communication with the light source and the developing station. The magnitude of the bias voltage at the developing station may be varied to decrease the flow of charged toner particles away from the developing station toward the areas to be developed on the photoreceptor. The bias voltage is the voltage level of the developer and therefore affects the amount of toner released onto the photoreceptor as the drum rotates through the developing station. In yet another embodiment, the controller modulates the light source voltage and is in circuit communication with the drum charging voltage and the bias voltage, and thus, affects the overall toner pile height.

Image Development

Figure 4A:
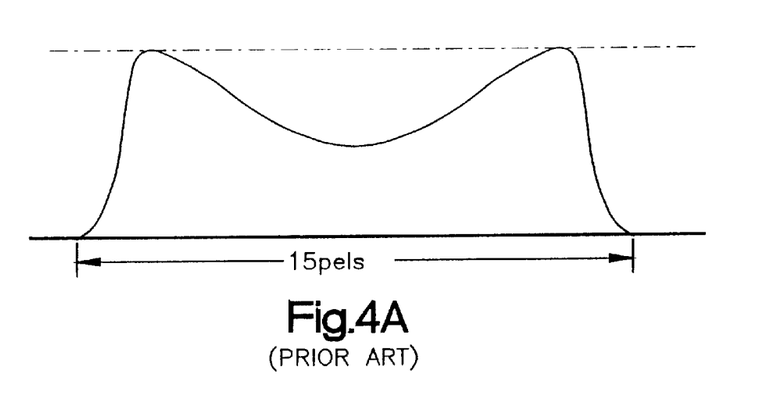
FIGS. 4A and 4B represent prior art profile views of a printing material having toner pile height of large patch print 4A and character print 4B as obtained from an electrophotographic apparatus of the prior art.
Figure 4B:
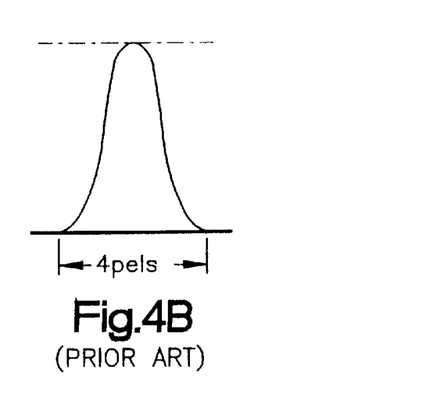

FIG. 4A and 4B represent the prior art. The figures show a profile view of a printing material and the toner pile height of a large patch print FIG. 4A and of character print FIG. 4B obtained from a conventional printer. The "edge effect" of toner pile height is caused by the high electric field gradient between a charged white background to a discharged PEL of the images to be printed. The interior PELs in FIG. 4A show a lower toner pile height that is the toner pile height predetermined for the desired optical density of the image. Because character images are made up of thin line strokes and the imaged lines are surrounded by white background areas, a sharp electrostatic field gradient is present across the entire width of a printed line or character. In a conventional printer, the toner pile height, FIG. 4B, causes a smear problem on printed medium, as the toner pile fractures easily subsequent to fusing.

Figure 5:
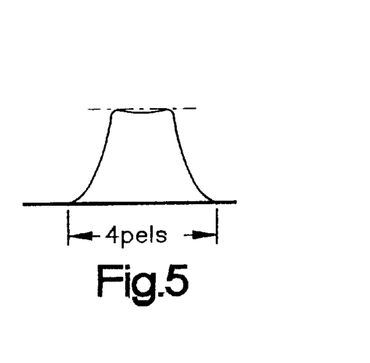
FIG. 5 is a profile view of printing material illustrating a character print produced by a printer which prints according to the method of the present invention.

By contrast, FIG. 5 illustrates a profile view of the toner pile height on printing material having a character print produced by an electrophotographic printer of the present invention. In comparing FIG. 5 to FIG. 4B, the edge PELs have the same toner pile height, however, the areas interior of the printed line or character have a reduced toner pile height. The edge PELs are unaffected by the mask patterns of the invention herein.

Program Logic Operation

Image pattern data is stored in memory and is organized such that each memory bit represents a specific PEL. In binary language, conventionally a "1" denotes "print" and a "0" denotes "no print." The program comprises at least one mask matrix made up of rows and columns of PEL overlays. Each PEL overlay contains either a "P" which denotes print, a "□" which denotes "no print" or a "X" which denotes "print or no print." For each and every PEL, the program compares the predetermined image pattern data to the mask matrix of PEL overlay data with the target PEL being lined up with the target PEL overlay.

Two-dimensional image pattern data of character stroke patterns are typically three to five PELs in size in at least one direction. It is important that the size of the mask pattern matrix is larger than the size of a character stroke pattern in at least one dimension so that the edge of a character stroke can be detected. Also, in order for the existence of an "internal PEL" a character stroke pattern must be at least the size of three PELs in at least one direction. Hence, a mask pattern having a series of "print" signal that is at least three PELs in size is the smallest mask pattern necessary for detecting internal PELs. Mask patterns may have a series of print signals that is larger than three PELs, however, the larger the mask pattern, the less frequently there will be a match and fewer PELs of a character stroke pattern will be affected.

Figure 6A:
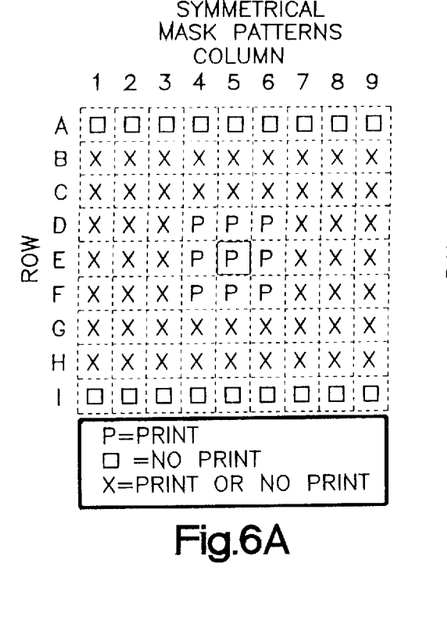
FIG. 6A is an example of a symmetrical mask pattern used in accordance with the present invention.
Figure 6B:
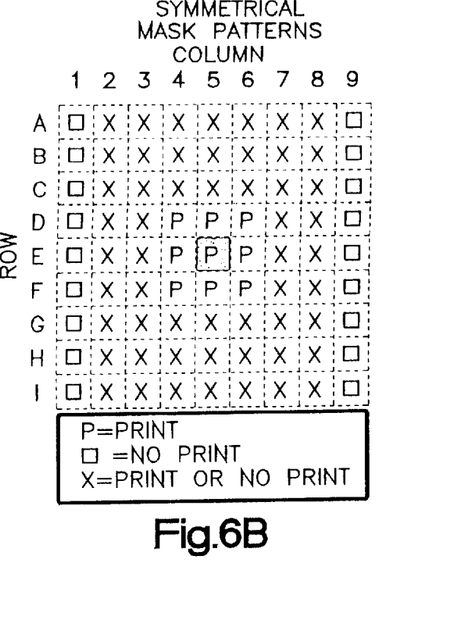
FIG. 6B is the symmetrical mask pattern of FIG. 6A which has been rotated 90°.

At the same time that program is determining whether the PEL to be printed is one of a line or character stroke pattern, the program determines whether the PEL to be printed is a PEL that is on the edge or interior of a line or character to be printed. If the PEL to be printed is interior of a character, then the voltage source is modulated accordingly. Mask matrices are read in at least two directions, the horizontal and vertical directions, when comparing the mask pattern with data elements of the two-dimensional image pattern data. Hence, mask pattern matrices may be rotated 900 for a second reading. FIG. 6A and FIG. 6B represent examples of mask pattern matrices of the present invention that can be used for determining whether the PEL to be printed requires modulation. FIG. 6A shows a symmetrical mask that when rotated 90° becomes the mask of FIG. 6B.

Figure 7:
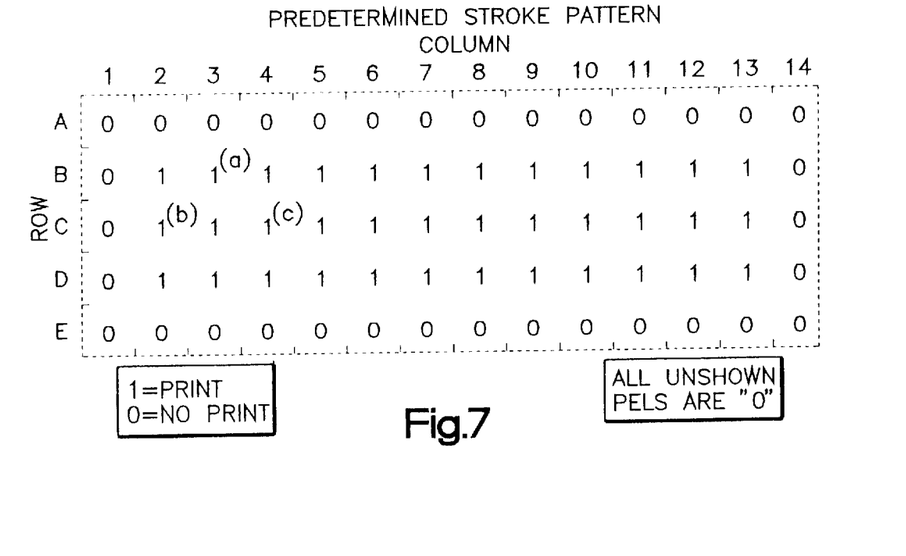
FIG. 7 is an example of image pattern data of at least a portion of a character stroke pattern that is stored in memory of an electrophotographic printer apparatus.

FIG. 7 shows an example of image pattern data and specifically a horizontal stroke pattern of a character. The area to be printed is only three PELs in size in one direction and 12 PELs in size in a second direction. That one dimension of image pattern data is smaller than any dimension of the mask matrix, indicates that this set of image pattern data is a character and not a large patch.

Figure 8:
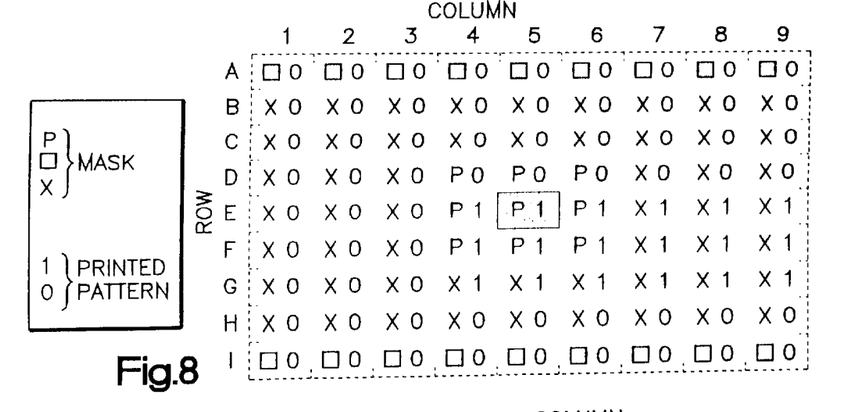
FIG. 8 shows a comparison reading of the character stroke pattern data of FIG. 7 at point (a) to the symmetrical mask pattern of FIGS. 6A or 6B in accordance with the present invention.
Figure 9:
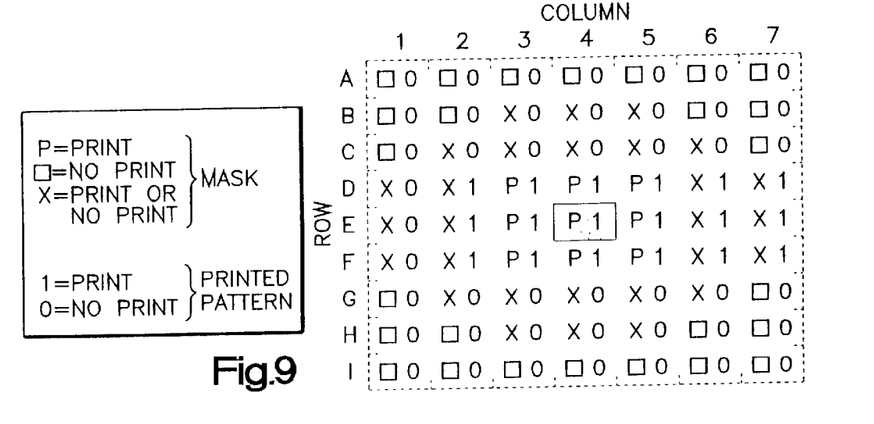
FIG. 9 shows a comparison reading of the character stroke pattern data of FIG. 7 at point (c) to the symmetrical mask pattern of FIGS. 6A or 6B in accordance with the present invention.

In comparing image pattern data to mask matrixes, mismatches will be found if a "P" of the mask matrix overlays a "0" of the image pattern data, or if the "□" of the mask matrix overlays a "1" of the image pattern data. If that combination is found when reading a target PEL, there will not be a total match, and there will be no action taken with respect to modulation of the voltage for the target PEL. The electrophotographic printer apparatus will continue to function as if the mask matrix were not present at all. FIG. 8 shows a comparison of the mask matrix of FIG. 6A and the predetermined image pattern data of FIG. 7 at the target PEL located at point (a). The shaded portion (Row E, Column 5) in FIG. 8 is the site of the target PEL. As can be seen in FIG. 8, there is a mismatch at Row D, Column 4; Row D, Column 5; and Row D, Column 6; and, therefore no action will be taken to modulate the voltage at the target PEL as indicated at point (a). Point (a) of FIG. 7 is positioned at the edge of the image pattern data, and the programmed mask pattern leaves the edge PEL unaffected to produce the desired result. FIG. 9 shows a comparison reading of the character stroke pattern data of FIG. 7 at the target PEL indicated by the letter (c) to the symmetrical mask pattern of FIG. 6A. FIG. 9 shows that the mask overlay is an exact match at every image pattern data, hence action will be taken. The program will signal the controller to affect the voltage source such that less toner is deposited onto interior PEL position (c).

Figure 10:
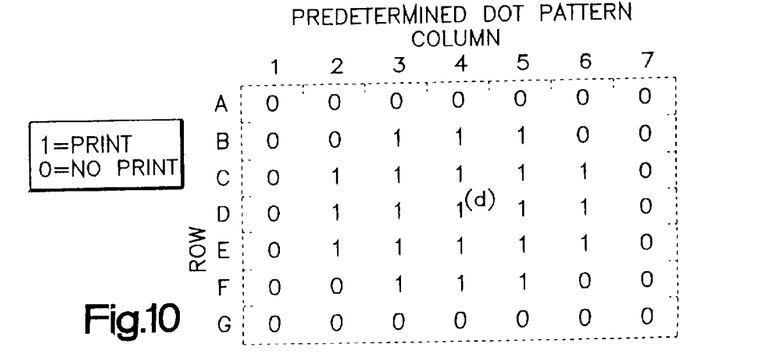
FIG. 10 is an example of symmetrical pattern data that makes up gray-level image data or half-tone image data that is stored in memory of an electrophotographic printer.
Figure 11:
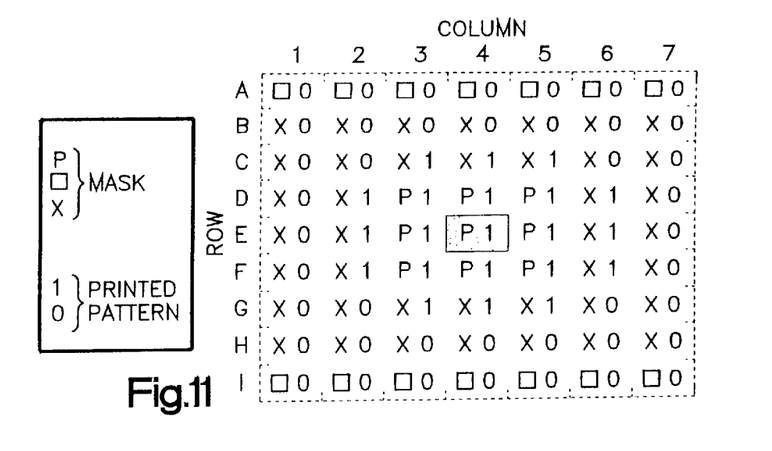
FIG. 11 shows a comparison reading of the half-tone image pattern data of FIG. 10 at point (d) to the symmetrical mask pattern of FIGS. 6A or 6B in accordance with the present invention.

FIG. 10 is an example of image pattern data of a gray-level or half-tone image data that may be stored in the memory of an electrophotographic printer. Gray-level image data is a conglomerate of two-dimensional symmetrical patterns, for example circular patterns, of print separated by white spaces that collectively produce a large print, such as a photograph. FIG. 11 shows a comparison reading of the gray-level image pattern data of FIG. 10 at the target PEL indicated by the letter (d) to the symmetrical mask pattern of FIG. 6A. FIG. 11 shows that the mask matrix which overlays the image pattern data of the gray-level image data is completely matched. As a result, action will be taken to modulate voltage at the target PEL (d) and thus the toner pile height at target PEL (d) will be reduced. Modulation of the light source at an internal PEL of gray-level or half-tone image data is undesirable since the optical density of the image will be affected. Thus as FIG. 11 illustrates, the mask matrices of FIG. 6A or 6B can distinguish characters from large patches but they cannot always distinguish internal areas of characters from internal areas of gray-level image data.

The invention herein, overcomes the above problem by providing an electrophotographic apparatus and method that further distinguishes character or line image data from symmetrical pattern data that make up gray-level image data. Since character strokes are often asymmetrical, the invention herein provides for mask patterns that can distinguish the internal areas of lines or character strokes from the internal areas of gray-level images.

Figure 12A:
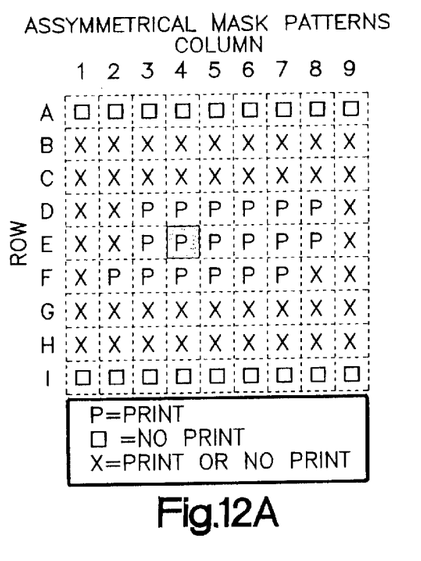
FIG. 12A is an example of an asymmetrical mask pattern used in accordance with the present invention.
Figure 12B:
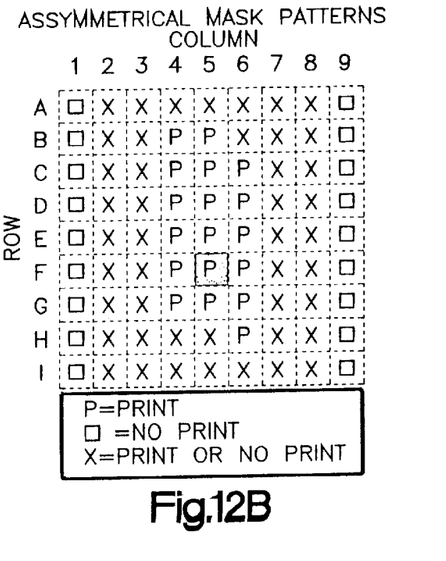
FIG. 12B is the asymmetrical mask pattern of FIG. 12A which has been rotated 90°.

FIG. 12A shows one example of an asymmetrical mask which when rotated 900 is the mask of FIG. 12B. An "asymmetrical mask" is herein defined as a mask having printed PEL that are not symmetric about the target PEL. Asymmetrical masks are useful to distinguish characters versus half-tone gray dots that may make up a large dark patch. Symmetrical mask patterns, such as those of FIGS. 6A and 6B could misidentify circular pattern images, that make up large patch images, as a character or line because the mask pattern matrix is larger than the circular patterns which are separated by white space. The asymmetrical configuration of the mask patterns shown in FIGS. 12A and 12B has seven consecutive PELs that indicate "P" for print. The mask pattern is wider than the number of PELs of circular pattern images that may be one PEL, 2 PELs, 3 PELs, 4 PELs or 5 PELs wide, which insures that the mask only finds a match for a character stroke which is larger than seven PELs in at least one dimension.

Figure 13:
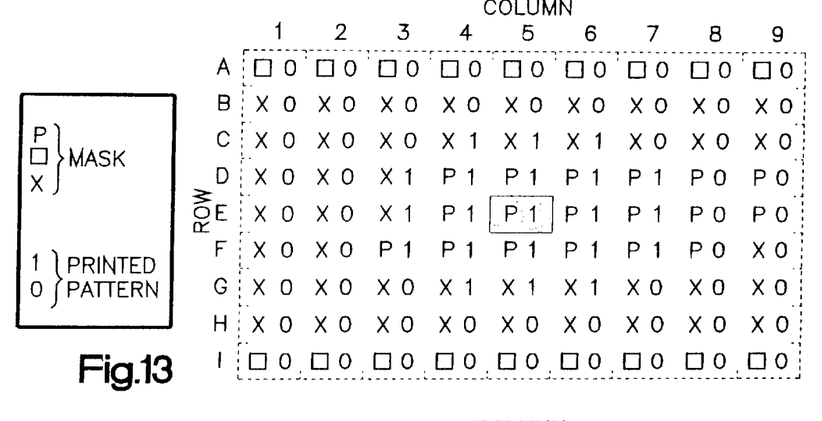
FIG. 13 shows a comparison reading of the half-tone image pattern data of FIG. 10 at point (d) to the asymmetrical mask pattern of FIG. 12A in accordance with the present invention.

FIG. 13 illustrates a comparison overlay of the mask matrix of FIG. 12A to the gray-level image pattern data at target PEL (d) of FIG. 10. A mismatch is found in Column 8 at Rows D, E and F, and Column 9 at Rows D and E. As a result, no action will be taken and the target PEL and the gray level image pattern remains unaffected.

Figure 14:
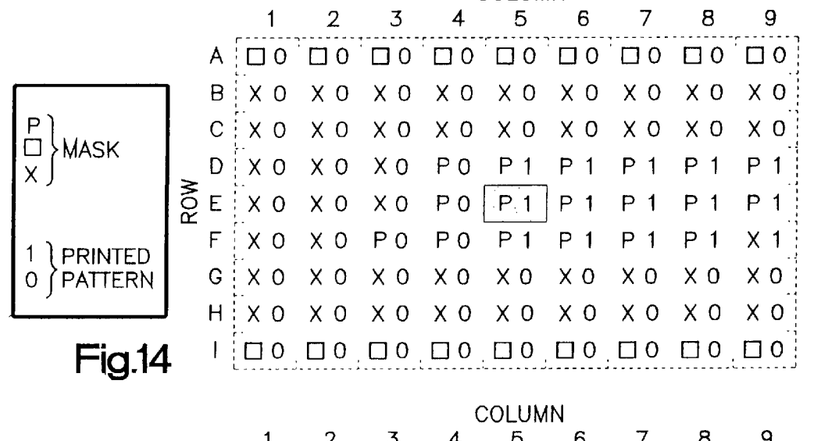
FIG. 14 shows a comparison reading of the character stroke pattern data of FIG. 7 at point (b) to the asymmetrical mask pattern of FIG. 12A in accordance with the present invention.
Figure 15:
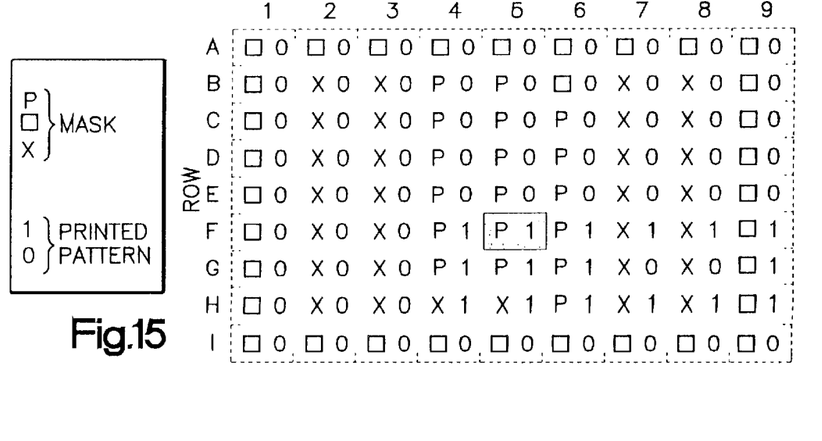
FIG. 15 shows a comparison reading of the character stroke pattern data of FIG. 7 at point (a) to the asymmetrical mask pattern of FIG. 12B in accordance with the present invention.

The asymmetric mask matrix of FIGS. 12A and 12B, however, will affect character stroke or line image pattern data per the desired outcome of the invention herein. For example, FIG. 14 shows mask matrix of FIG. 12A compared with the predetermined image pattern data of FIG. 7 at target PEL (b) position Row 2, Column 3. A mismatch is found in Column 3 at Row F, and in Column 4 at Rows D, E and F. Therefore no action is taken for the target PEL position as labeled by (b) of FIG. 7. FIG. 15 illustrates a comparison overlay of the mask matrix of FIG. 12B to the character stroke pattern at target PEL (a) of FIG. 7. A mismatch is found in Column 4 at Rows A, B, C and D; in Column 5 at Rows A, B, C and D; and in Column 6 at Rows B, C and D. Hence no action is taken and the target PEL will print as programmed without modulation.

The above discussion makes reference to the DAD process. If the CAD process is used, and the program determines that action is to be taken, then the voltage source will discharge areas interior of the line or character to a greater degree then originally programmed.

Other modifications and variations of the present invention are possible in light of the above teachings. For example, several other mask patterns can be created to ensure that the voltage source applied to PELs which are interior of a character are modulated. Also, the sizes of the masks may change depending upon the size of the printed characters. It is to be understood, however, that changes may be made in the particular embodiments described above which are within the full-intended scope of the invention as defined in the appended claims.

What is claimed is:

1. An electrophotographic printer apparatus that reduces smearing of two-dimensional printed images on printed medium, the two-dimensional images comprised of predetermined image pattern generated from data representing either print or blank in a matrix of positions arranged in horizontal rows and vertical columns, the apparatus comprising:

a voltage source;

a memory for storing the predetermined image pattern data;

a program comprising at least one mask matrix, wherein the program performs logical operations to compare the at least one mask matrix with the predetermined image pattern data on a PEL by-PEL basis to determine whether a target PEL is positioned interior of a character or line; and, a controller that modulates the voltage source if the target PEL is positioned interior of a character or line.

2. The electrophotographic printer apparatus of claim 1 further comprising toner applied as a pile on the printed medium, wherein modulation of the voltage source reduces the pile height of the toner.

3. The electrophotographic printer apparatus of claim 1 wherein said voltage source controls a light.

4. The electrophotographic printer apparatus of claim 3 wherein the light is a laser or a light emitting diode.

5. The electrophotographic printer apparatus of claim 1:
wherein the predetermined image pattern data comprises a target PEL and the mask matrix comprises a target PEL overlay; wherein the predetermined image pattern data is compared to the mask matrix with the target PEL being aligned with the target PEL overlay; and, wherein the controller modulates the voltage source at the target PEL if the predetermined image pattern data matches the entire mask matrix.

6. The electrophotographic printer of claim 1 wherein the predetermined image pattern data comprises character and line images and symmetrical patterns that collectively produce a gray-level image, and wherein the mask matrix distinguishes a PEL that is interior of the character or the line from a PEL that is interior of the gray-level image.

7. The electrophotographic printer apparatus according to claim 6 wherein the mask matrix comprises an asymmetrical pattern.

8. An electrophotographic printer apparatus that reduces smearing of two-dimensional printed images on printed medium, the two-dimensional images comprised of predetermined image pattern generated from data representing either print or blank in a matrix of positions arranged in horizontal rows and vertical columns, the apparatus comprising:
a voltage source;
a memory for storing the predetermined image pattern data;
a program comprising at least one mask matrix, wherein the program performs logical operations to compare the at least one mask matrix with the predetermined image pattern data on a PEL by-PEL basis to determine whether a target PEL is positioned interior of a character or line; and,
a controller that modulates the voltage source if the target PEL is positioned interior of a character or line, wherein the voltage source controls a light, wherein the light is in circuit communication with a developing station, and wherein modulation of the voltage source reduces the pile height of toner applied to the printed medium.

9. An electrophotographic printer apparatus that reduces smearing of two-dimensional printed images on printed medium, the two-dimensional images comprised of predetermined image pattern generated from data representing either print or blank in a matrix of positions arranged in horizontal rows and vertical columns, the apparatus comprising:
a voltage source;
a memory for storing the predetermined image pattern data;
a program comprising at least one mask matrix, wherein the program performs logical operations to compare the at least one mask matrix with the predetermined image pattern data on a PEL by-PEL basis to determine whether a target PEL is positioned interior of a character or line; and,
a controller that modulates the voltage source if the target PEL is positioned interior of a character or line, wherein the voltage source controls a light, wherein the light is in circuit communication with a drum charging station, and wherein modulation of the voltage source reduces the pile height of toner applied to the printed medium.

10. A method of reducing smearing of two dimensional printed images printed by an electrophotographic printer apparatus on printed medium the two-dimensional images comprised of predetermined image pattern data representing either print or a blank in a matrix of positions arranged in horizontal rows and vertical columns, the method comprising:
providing a mask matrix;
comparing the predetermined image pattern data with the mask matrix on a PEL-by-PEL basis; and,
modulating a voltage source at a target PEL if the target PEL is positioned interior of a character or line.

11. The method of claim 10 further comprising:
providing toner applied in a pile on the printed medium, wherein modulating the voltage source reduces the pile height of toner.

12. The method of claim 10 wherein the voltage source controls a light.

13. The method of claim 10 wherein the light is a laser or a light emitting diode.

14. The method of claim 10 wherein the predetermined image pattern data comprises a target PEL and the mask matrix comprises a target PEL overlay, wherein the predetermined image pattern data is compared to the mask matrix with the target PEL being aligned with the target PEL overlay; and, wherein the controller modulates the voltage source at the target PEL if the predetermined image pattern data matches the entire mask matrix.

15. The method of claim 10 wherein the predetermined image pattern data comprises character and line images and symmetrical patterns that collectively produce a gray-level image, and wherein the mask matrix distinguishes a PEL that is interior of the character or line from a PEL that is interior of the gray-level image.

16. The method according to claim 15 wherein the mask matrix comprises an asymmetrical pattern.

17. The method according to claim 16 wherein the, and the predetermined image pattern data is compared with the mask matrix in a first position, and is then compared with the mask matrix rotated to a second position 90° from the first position.

18. A method of reducing smearing of two dimensional printed images printed by an electrophotographic printer apparatus on printed medium, the two-dimensional images comprised of predetermined image pattern data representing either print or a blank in a matrix of positions arranged in horizontal rows and vertical columns, the method comprising:
providing a mask matrix;
comparing the predetermined image pattern data with the mask matrix on a PEL-by-PEL basis;
modulating a voltage source at a target PEL if the target PEL is positioned interior of a character or line, and applying toner in a pile on the printed medium, wherein the voltage source controls a light, wherein the light is in circuit communication with a developing station, and wherein modulation of the voltage source reduces the pile height of the applied toner.

19. A method of reducing smearing of two dimensional printed images printed by an electrophotographic printer apparatus on printed medium, the two-dimensional images comprised of predetermined image pattern data representing either print or a blank in a matrix of positions arranged in horizontal rows and vertical columns, the method comprising:

providing a mask matrix;

comparing the predetermined image pattern data with the mask matrix on a PEL-by-PEL basis; and, modulating a voltage source at a target PEL if the target PEL is positioned interior of a character or line; and applying toner in a pile on the printed medium, wherein the voltage source controls a light, wherein the light is in circuit communication with a drum charging station, and wherein modulation of the voltage source reduces the pile height of toner.

* * * * *

UNITED STATES PATENT AND TRADEMARK OFFICE
CERTIFICATE OF CORRECTION

PATENT NO.     : 6,177,948 B1
DATED          : January 23, 2001
INVENTOR(S)    : Dennis C. Estabrooks and Jack L. Zable It is certified that error appears in the above-identified patent and that said Letters Patent is hereby corrected as shown below:

Column 5,
Line 20, after "controller", the numeral "5" should be deleted.

Column 8,
Line 4, after "rotated", delete "900" and insert therefor -- 90° --.

Signed and Sealed this

Sixth Day of November, 2001

*Attest:*

NICHOLAS P. GODICI
*Attesting Officer*     *Acting Director of the United States Patent and Trademark Office*